April 28, 1964     B. M. BROWN ETAL     3,130,899
BLOWER
Filed July 24, 1963
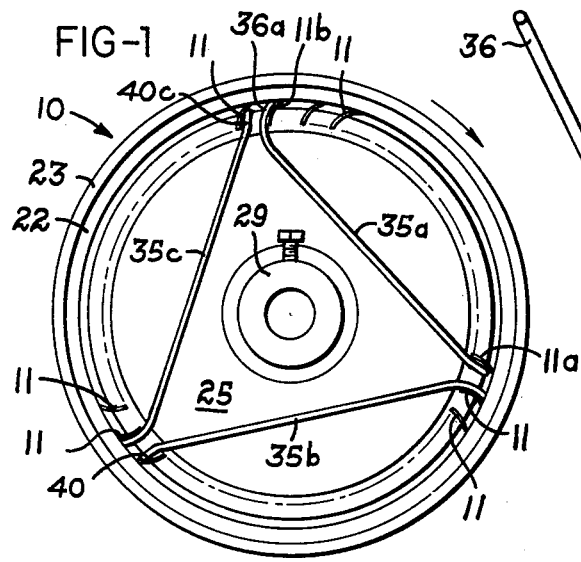
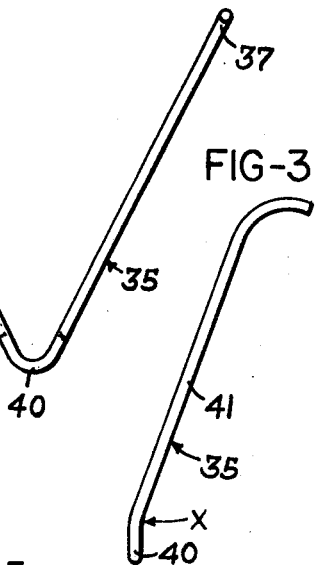
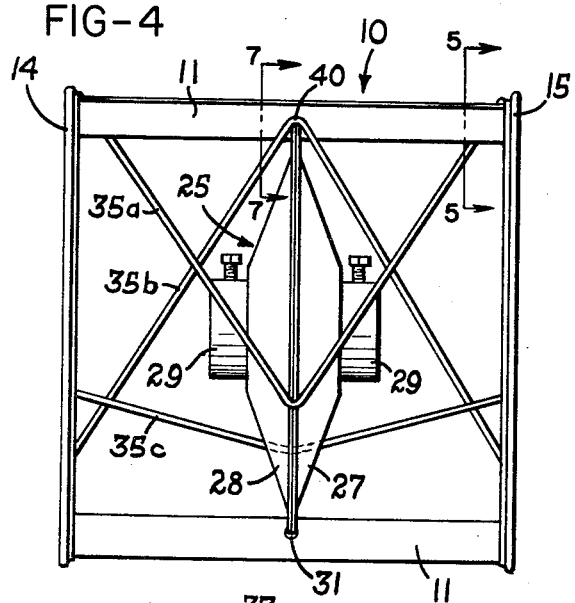
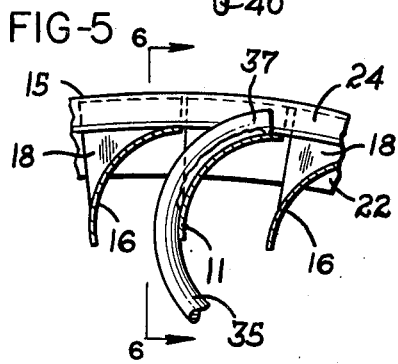
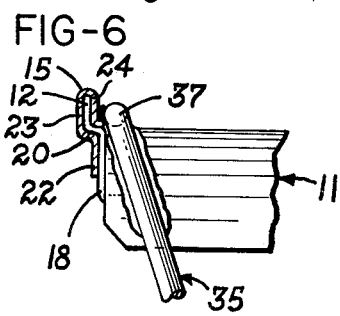
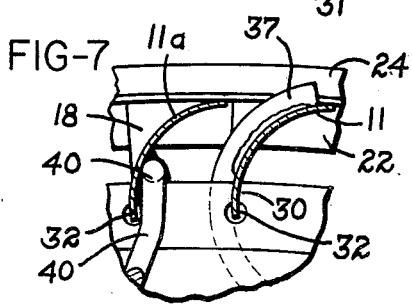
INVENTORS
BURTON M. BROWN,
BY WILBUR E. PASH &
WILLIAM P. POWELL
Marechal, Biebel, French & Bugg
ATTORNEYS

United States Patent Office 3,130,899
Patented Apr. 28, 1964

3,130,899
BLOWER
Burton M. Brown, Dayton, Ohio, Wilbur E. Pash, Indianapolis, Ind., and William P. Powell, Dayton, Ohio, assignors to The Lau Blower Company, Dayton, Ohio, a corporation of Ohio
Filed July 24, 1963, Ser. No. 297,429
9 Claims. (Cl. 230—134)

This invention relates to a centrifugal blower wheel, and particularly to a blower wheel having braces therein for increasing the rigidity thereof.

When conventional blowers are used in the class II range, that is, when they develop a total pressure of more than 3.75 inches of water, the blower wheel must be rotated at very high speeds and thus is susceptible to failure caused by the centrifugal forces and high frequency vibrations acting thereon. Brace rods have been used in conventional blower wheels to connect the end rings to the hub or center disk in order to strengthen the wheels against deformation caused by the centrifugal forces which would otherwise cause failure of the wheel, but they have been rods difficult and expensive to install and have not effectively counteracted the forces of acceleration and deceleration which tend to loosen the various connections in fabricated blower wheels. Moreover, some of these brace rods have had threaded connections with the hub or center disk which permitted an inexperienced worker to adjust the tension of the brace rods, thus creating undesirable stresses and causing unbalance and possible failure of the blower wheel.

Accordingly, an important object of this invention is to provide an improved blower wheel capable of resisting failure when subjected to high starting torques and rotation at high speed, and which can be manufactured at a relatively low cost in comparison to presently available blower wheels designed for such high performance.

Another object of this invention is to provide a high performance blower wheel capable of fabrication by conventional techniques with the addition of brace rods which are secured rigidly to the blower, and particularly to provide a blower wheel with a brace rod arrangement which withstands starting torques and high speeds to a greater extent than brace rods presently known and which does not materially decrease the flow of air through the blower wheel.

A further object of this invention is to provide a blower wheel of the aforesaid type which can be manufactured in a minimum of time without requiring special brace rod adjustments, and further to provide a blower wheel of the brace rod type which is less susceptible to becoming misaligned and loosened by rough handling during shipment or installation.

Additional objects and advantages of the invention will be apparent from the following description, the accompanying drawings and the appended claims.

In the drawings—

FIG. 1 is an end view of a double inlet blower wheel embodying the invention;

FIG. 2 is a plan view of one of the brace rods used in the blower wheel shown in FIG. 1;

FIG. 3 is a side view of the brace rod shown in FIG. 2;

FIG. 4 is a side elevational view of the blower wheel shown in FIG. 1 with a large number of the blades removed;

FIG. 5 is a sectional view taken essentially along the line 5—5 of FIG. 4;

FIG. 6 is another sectional view taken along the line 6—6 of FIG. 5; and

FIG. 7 is a sectional view along the line 7—7 of FIG. 4.

Referring to the drawing wherein a preferred embodiment of the invention is shown, FIGS. 1 and 4 illustrate end and side views, respectively, of a blower wheel 10 constructed in accordance with the invention and including a plurality of parallel and circumferentially disposed blades 11. Each blade has flanges 12 (FIGS. 6) on each end thereof over which are spun the end rings 14 and 15 for securing the blades in predetermined relation to each other, and this end ring and blade structure is shown as substantially identical with that described in the United States patent to Wilken, No. 2,537,805, and issued January 9, 1951, to the assignee of this application.

Each of the blades 11 has a curved working surface 16 which is arcuately shaped in a uniform manner over the major portion of the length thereof. A radially extending wall 18 projects from the convex side of the surface 16 at each end thereof, and the flanges 12 are deformed upwardly from the outer edge of the walls 18 so that they extend radially outwardly of and overhang the working faces 16 of the blades 11.

As disclosed in the aforesaid Wilken patent, the end rings 14 and 15 lock the blades 11 in parallel relation about the circumference of the blower wheel. For this purpose, the end rings 14 and 15 are provided with offset shoulders 20 which support the inner edges of the flanges 12, and inwardly extending flange 22 which engages the walls 18 of the blades. The side walls 23 and 24 are then spun over the flanges 12 thus tightly locking each of the blades 11 in place.

Midway between the end rings 14 and 15 is the center disk 25 which is securely fastened to each of the blades 11 so that the cage formed by the blades 11 and the end rings 14 and 15 rotates with the disk 25. The particular center disk structure shown is of the type disclosed in the United States patent to Wilken, No. 2,852,182, and issued September 16, 1958, to the assignee of this invention. Thus the center disk structure includes oppositely disposed disk shaped plates 27 and 28, each of which has a hub 29 rigidly secured thereto for securing the blower wheel 10 to a drive shaft, not shown. Each of the disks 27 and 28 has tongue portions 30 (FIG. 7) which extend through the apertures 31 near the trailing edges 32 of the blades 11 to interconnect the disks and the blades, in a manner substantially identical to that disclosed in U.S. Patent No. 2,852,182.

While a particular construction of blades, end rings and center disk has been shown and described, it is within the scope of the invention to construct, assembly or fabricate the end rings, blades, and center disk in any manner capabale of securing them together in substantially the arrangement described above. The important feature is that the blower wheel must have some means to hold the blades in the parallel circumferential arrangement, and a center disk structure which supports the blower wheel on a drive shaft for rotation. For example, the blade ends could be brazed to a flat annulus or end rings, and a simple flat center disk could be suitably secured to the blades.

An important feature of the invention resides in the use of the V-shaped brace rods 35 (FIG. 2) which are used to strengthen the blower wheel 10 and to increase its capability to withstand starting torques, operational speeds, and vibration which would otherwise cause failure of a blower wheel. The rods are first placed in the blower wheel 10 with end portions 36 and 37 adjacent the end rings 14 and 15, respectively, and the apex portion on the outer periphery of the center disk 25, as will be described. The brace rods 35 are preferably constructed of metal and are of relatively small diameter so that their resistance to flow of air through the blower wheel 10 is held to a minimum.

The end portions 36 and 37 of the brace rods 35 are curved so that they are complementary to the convex surfaces 16 of the blades 11, as seen in FIGS. 5 and 6, for maximum contact therebetween. The end portions 36 and 37 also lie against a portion of the end walls 18 of the blades 11 and the edge of the side walls 24 of the end rings thus providing a substantial area of contact therebetween, so that these parts may be securely brazed together throughout the entire area of contact (FIGS. 5 and 6).

The apex portion 40 of each V-shaped brace rod 35 is deformed from the plane of the main portions 41 thereof so that when it is placed in the blower wheel, the apex portion will be positioned against the concave surface of one of the blades 11 (FIG. 7). The portion 40 is brazed to the adjacent blade along the line of contact therebetween, as well as to the periphery of the center disk 25, as seen in FIG. 7, thus providing a rigid connection between the end rings 14 and 15 and the center disk 25. This positioning provides maximum clearance between the rod 35 and the next closest blade, increasing the accessibility to this area so that the brazing operation can be done quickly and easily, and the bend in the rod marked "x" in FIG. 3 also contributes to this purpose. The particular configuration of the end and apex portions 36, 37 and 40 aids in the precise positioning of the brace rods 35 in the blower wheel 10 prior to the brazing operation. Thus a total of only three brazes is required to connect each of the V-shaped rods 35 in the blower wheel 10.

As shown in FIG. 1, a preferred embodiment of the invention utilizes three such brace rods 35a, 35b, and 35c arranged in a triangle, with the end portions of each brace rod being aligned in an axial direction with the apex portion 40 of the next adjacent brace rod. As seen in FIGS. 1 and 7, the end portions of one rod 35 are connected to a blade adjacent the blade to which the apex portion of the adjacent rod is secured. This arrangement balances the blower wheel so that the rods 35 themselves do not cause vibrations and possible failure when the blower wheel is rotated at high speed. Moreover, this triangular arrangement of brace rods creates a particularly strong blower capable of resisting the forces created by high starting torques and operational speeds.

An important feature of the invention is that each of the brace rods 35 extends from the periphery of the center disk 25 along a cord of the blower wheel in a trailing direction to the end rings 14 and 15, so that in effect, the center disk maintains a trailing portion of the end rings 14 and 15 in rigid alignment therewith. That is, considering that the blower wheel 10 of FIG. 1 rotates in a clockwise direction, the main portions 41 of each of the rods 35 extend from the center disk 25 to a connection with the end rings 14 and 15 at a point which trails the connection of the apex portion 40 to the center disk 25. For example, the rod 35a has its apex portion connected to the disk 25 at the blade section 11a, while the end portions 36a and 37a are connected to the blade 11b in alignment with the apex portion 40c of the rod 35c which is secured to the blade adjacent the blade 11b.

Thus when the blower wheel 10 is being driven by a large motor, and especially during starting when the blower wheel 10 is subjected to high starting torques, the brace rods 35 prohibit the end rings 14 and 15, and the ends of the blades 11, from lagging behind the center disk 25 as would occur without the brace rods 35. Since the rods 35 are rigid and therefore resist compression as well as tension, any tendency of the end rings 14 and 15 to lag the center disk 25 during deceleration of the blower wheel 11 is also effectively prevented. The rods 35 also resist movement of the end rings 14 and 15 from a concentric relationship with the center disk 25 such as then occur at high speed and which is the first step in the failure of the blower wheel.

The invention thus provides a blower wheel which is capable of withstanding rapid acceleration to and operation at speeds required to develop the Class II range of pressure, while actually decreasing the cost of parts and labor required to fabricate the blower wheel. The brace rods furthermore can be adapted for use in substantially any blower wheel regardless of the manner in which the blower wheel is manufactured, and they do not substantially reduce the flow of air through the blower wheel or permit adjustment, so that once the rods are brazed in place, they cannot be utilized to create undesirable stresses in the blower wheel.

The manner in which the rods 35 are secured to the blower wheel has been shown and described in its preferred embodiment, although it is within the scope of the invention to use other conventional expedients to secure these rods in place. For example, rivets could be used in some blower wheels to secure the brace rods in position. The brace rods can also be secured directly to the inside or outside of the end rings without departing from the scope of the invention, and the apex portion 40 of the rods could be connected solely to the center disk spaced from contact or any connection with the blades of the blower wheel.

It is also possible to use more than three of the brace rods 35 in a blower wheel, and this may be especially desirable in larger blower wheels wherein the centrifugal forces developed are correspondingly greater than smaller blower wheels. The rods can also be arranged so that they overlap when viewed in an axial direction, and thus the apex portions of the rods need not necessarily be secured in axial alignment with end portions of the adjacent brace rod, although this arrangement is preferred. However, in all cases the brace rods must be balanced about the axis of the blower wheel, and the main portions of the rods extend in a trailing direction from near the periphery of the center disk or back plate to the end rings.

While the form of the apparatus herein described constitutes a preferred embodiment of the invention, it is to be understood that the invention is not limited to this precise form of apparatus, and that changes may be made therein without departing from the scope of the invention which is defined in the appanded claims.

What is claimed is:

1. A blower wheel assembly comprising a double inlet centrifugal blower wheel having a series of spaced parallel blades arranged to form the cylindrical side walls of the blower wheel; an end ring at each end of said blades defining inlets to the blower wheel; a center disk secured midway between said end rings to the innermost portions of said blades; hub means on said center disk for mounting the blower wheel for rotation; a plurality of V-shaped reinforcing rods each of which has an apex portion and end portions; each of said rods having a first rigid connection between said apex portion and the outer periphery of said center disk, said end portions being disposed on opposite sides of said center disk, a second rigid connection between one of said end portions and one of said end rings, and a third rigid connection between the other of said end portions and the other of said end rings, said second and third connections being located in the same axial plane and trailing said first connection in the direction of rotation of said wheel so that said rods effectively resist the forces imparted to said blower wheel during rapid acceleration and high speed rotation thereof.

2. A blower wheel assembly comprising a double inlet centrifugal blower wheel having a series of spaced parallel blades arranged to form the cylindrical side walls of the blower wheel; an end ring at each end of said blades defining inlets to the blower wheel; a center disk secured between said end rings to the innermost portions of said blades; hub means on said center disk for mounting the blower wheel for rotation; a plurality of V-shaped reinforcing rods each of which has an apex portion and end portions; each of said rods having a first rigid connection between said apex portion and the outer periphery of said center disk, said end portions being disposed on opposite sides of said center disk and being curved so that they lie in contact with the outer surface of one of said blades near the opposite ends thereof adjacent said end rings, a second rigid connection between one of said end portions and said one blade adjacent one of said end rings, and a third rigid connection between the other of said end portions and said one blade adjacent the other of said end rings, said second and third connections being located in the same axial plane and trailing said first connection in the direction of rotation of said wheel so that said rods effectively resist the forces imparted to said blower wheel during high performance operation thereof.

3. A blower wheel assembly comprising a double inlet centrifugal blower wheel having a series of spaced parallel blades arranged to form the cylindrical side walls of the blower wheel; an end ring at each end of said blades defining inlets to the blower wheel; a center disk secured midway between said end rings to the innermost portions of said blades; a plurality of V-shaped reinforcing rods each of which has an apex portion and end portions; each of said rods having a first rigid connection between said apex portion and the outer periphery of said center disk, said end portions being disposed on opposite sides of said center disk internally of the blower wheel, a second rigid connection between one of said end portions and one of said end rings, and a third rigid connection between the other of said end portions and the other of said end rings, said second and third connections being located in the same axial plane and trailing said first connection in the direction of rotation of said wheel so that said rods effectively resist the forces imparted to said blower wheel during rapid acceleration and high speed rotation thereof; and said reinforcing rods being arranged with said end portions of each of said rods axially aligned with the said apex portion of the adjacent said rod for balancing said blower wheel in weight and resistance to deformation.

4. A blower wheel assembly comprising a double inlet centrifugal blower wheel having a series of spaced parallel blades arranged to form the cylindrical side walls of said blower wheel; an end ring at each end of said blades defining inlets to the blower wheel; a center disk secured midway between said end rings to the innermost portions of said blades; hub means on said center disk for mounting the blower wheel for rotation; three V-shaped reinforcing rods secured in said blower wheel and arranged to form a triangle when viewed in a direction axial through either of said inlets; each of said rods having an apex portion on two end portions, a first rigid connection between said apex portion and the outer periphery of said center disk, said end portions being disposed on opposite sides of said center disk internally of the blower wheel, a second rigid connection between one of said end portions and one of said end rings, and a third rigid connection between the other of said end portions and the other of said end rings; said second and third connections on each of said rods and said first connection of the adjacent rod being secured to adjacent blades, and said first and second connections of each said rod trailing said first connection thereof in the direction of rotation of said wheel so that said braces effectively resist the forces imparted to said blower wheel by rapid acceleration and high speed rotation.

5. A reinforced blower wheel assembly comprising a double inlet centrifugal blower wheel having a series of spaced parallel blades interconnected by an end ring at each end of said blades for locking said blades in position and defining inlets to the blower wheel; a center disk secured midway between said end rings to the innermost portions of said blades; hub means on said center disk for mounting the blower wheel for rotation; a plurality of reinforcing rods each of which has a center portion and end portions; each of said rods having a first connection between said center portion and said center disk near the outer periphery thereof, said end portions being disposed on opposite sides of said center disk and deformed so that one of said end portions lies against the convex side of a first end of one of said blades and the other of said end portions lies against the other end of said one blade, a second connection between said one end portion and said first end of said one blade, and a third connection between said other end portion and the other end of said one blade, said second and third connections being located in the same axial plane and trailing said first connection in the direction of rotation of said wheel so that said rods effectively resist the forces imparted to said blower wheel during operation thereof; and said rods being arranged symmetrically in said blower wheel.

6. A reinforced blower wheel assembly comprising a double inlet centrifugal blower wheel including a plurality of spaced parallel blades having an end ring at the opposite ends of said blades defining inlets to the blower wheel; a center disk secured internally of said blower wheel between said inlets; a plurality of elongated reinforcing members each of which has a center portion and end portions; each of said reinforcing members having a first connection between said center portion and said center disk near the outer periphery thereof, said end portions being disposed on opposite sides of said center disk, a second connection between one of said end portions and one of said end rings internally of said blower wheel, and a third connection between the other of said end portions and the other of said end rings internally of said blower wheel said second and third connections being located in the same axial plane and trailing said first connection in the direction of rotation of said wheel so that said reinforcing members effectively resist the forces imparted to said blower wheel during rapid acceleration or high speed rotation thereof.

7. A reinforced blower wheel assembly comprising a double inlet centrifugal blower wheel having a series of spaced parallel blades interconnected by an end ring at each end of said blades and defining inlets to the blower wheel; a center disk secured midway between said end rings to the innermost portions of said blades; hub means on said center disk for mounting the blower wheel on a drive shaft; a plurality of V-shaped reinforcing rods each of which has an apex portion and end portions; each of said rods having a first rigid connection between said apex portion and said center disk near the outer periphery thereof, said end portions being disposed on opposite side of said center disk and deformed to lie against the convex side of one of said blades, a second rigid connection between one of said end portions and one of said end rings, and a third rigid connection between the other of said end portions and the other of said end rings, said second and third connections being located in the same axial plane.

8. A reinforced blower wheel assembly comprising a centrifugal blower wheel including a plurality of spaced parallel blades having an end ring secured at one end of said blades and defining an inlet to said blower wheel, a mounting disk secured to said blades at a position remote from said inlet, hub means on said mounting disk for positioning said blower wheel for rotation, a plurality of reinforcing rods secured in said blower wheel, each of said rods having a first rigid connection with said mounting disk near the outer periphery thereof and a second rigid connection with said end ring internally of said blower wheel, said second connections trailing said first connection in the direction of rotation of said wheel so that said rods effectively resist the stresses imparted to said blower wheel during high speed rotation or rapid acceleration thereof.

9. A reinforced blower wheel assembly comprising a centrifugal blower wheel including a plurality of spaced parallel blades having an end ring secured at one end of said blades and defining an inlet to the blower wheel; a radially extending mounting disk secured to said blades at a position remote from said inlet; hub means on said mounting disk for rotating said blower wheel; three reinforcing rods secured in said blower wheel and arranged to form a triangle when viewed in an axial direction through said inlet; each of said rods having a first rigid connection with said mounting disk near the outer periphery thereof, an end portion deformed to lie against the convex side of one of said blades internally of said blower wheel and adjacent said end ring, and a second connection between said end portions and said convex side, said second connection trailing said first connection in the direction of rotation of said wheel so that said rods effectively resist the forces imparted to said blower wheel during high performance operation thereof.

References Cited in the file of this patent

UNITED STATES PATENTS

| | | |
|---|---|---|
| 1,128,475 | Maxfield | Feb. 16, 1915 |
| 1,354,673 | Mathis | Oct. 5, 1920 |
| 1,652,285 | McMurdie | Dec. 13, 1927 |
| 2,537,805 | Wilken | Jan. 9, 1951 |
| 2,852,182 | Wilken | Sept. 16, 1958 |